UNITED STATES PATENT OFFICE.

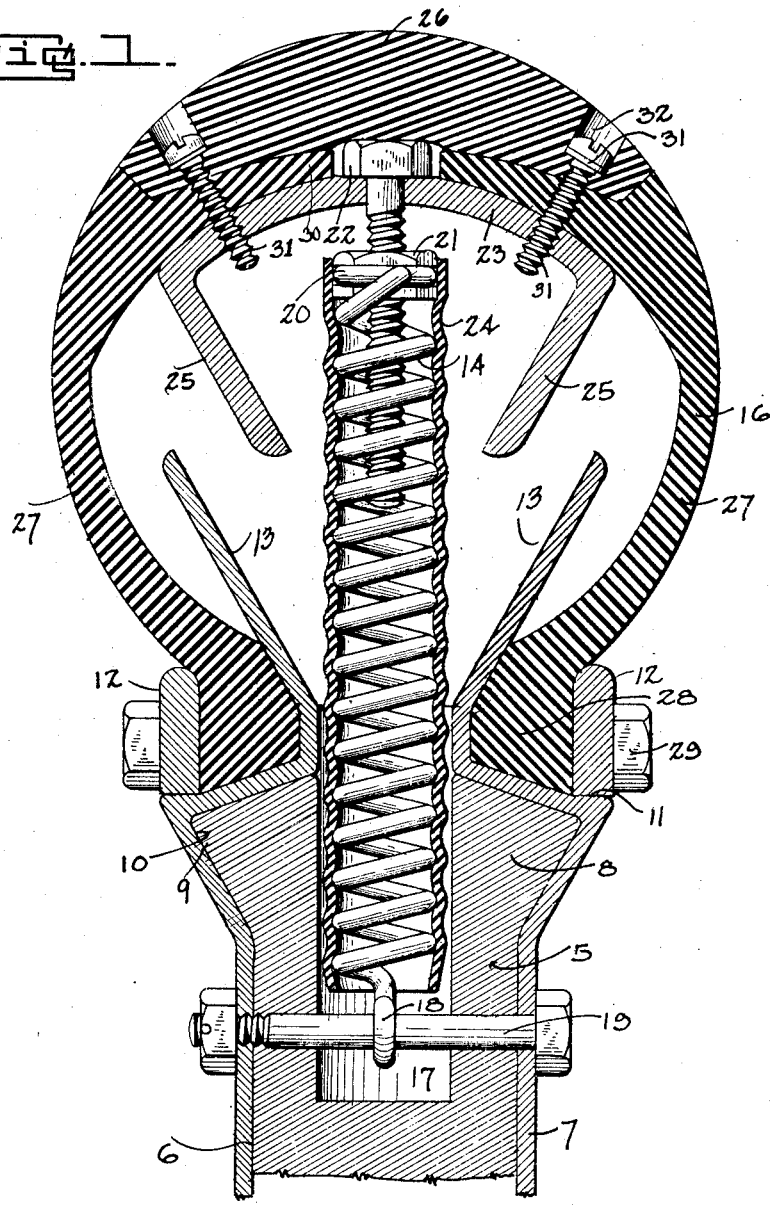

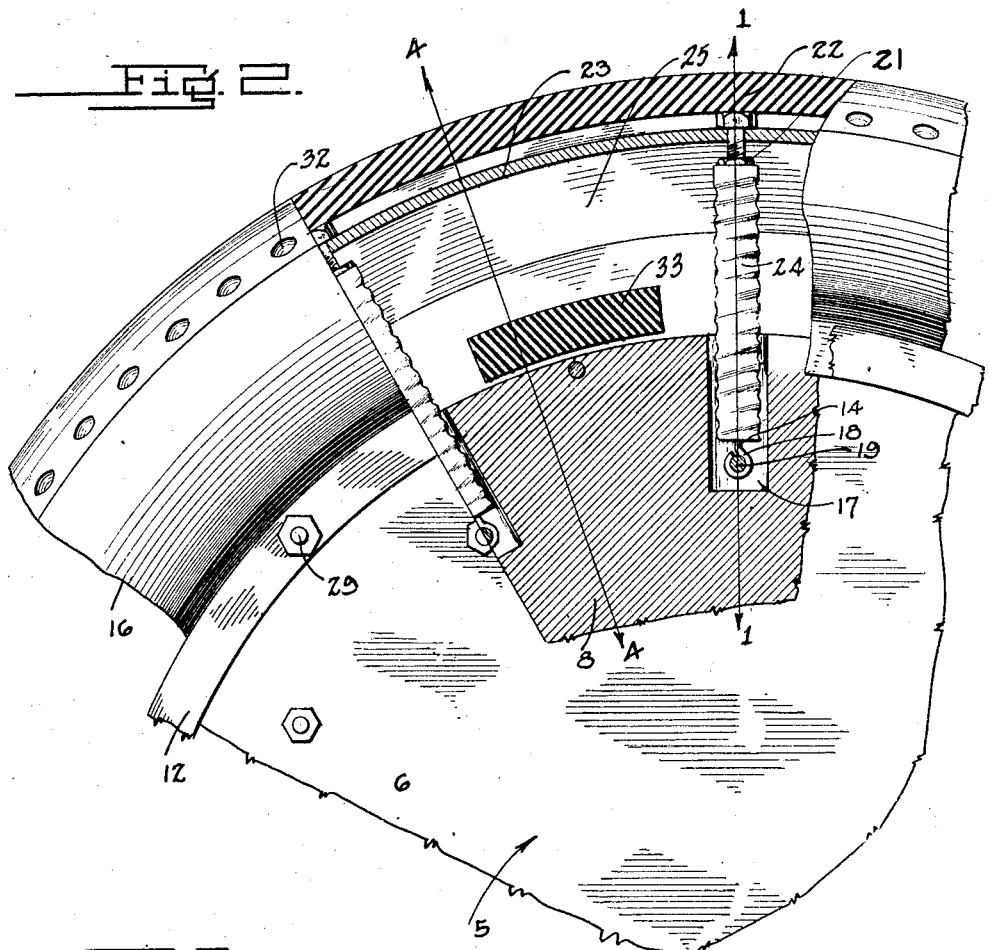
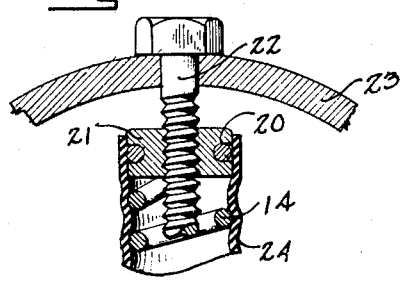

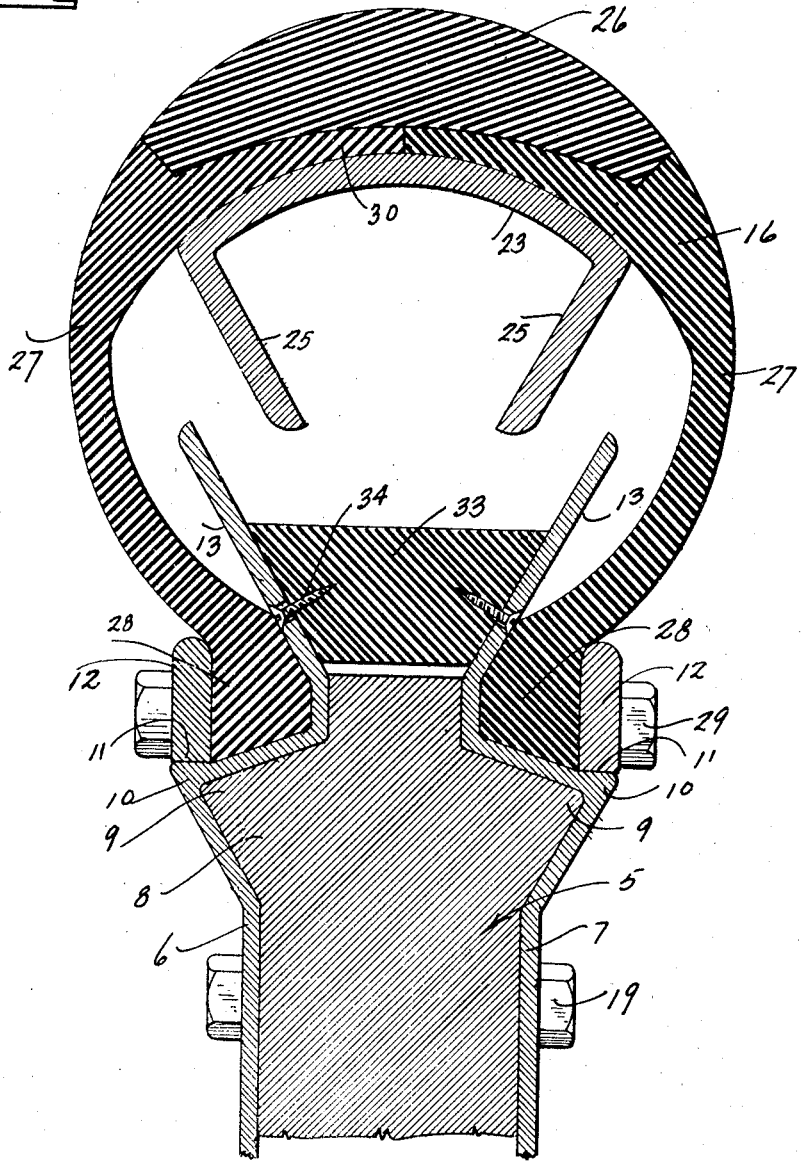

EMORY A. THOMPSON, OF HOPE, ARKANSAS.

VEHICLE-WHEEL.

1,352,639.  Specification of Letters Patent.  Patented Sept. 14, 1920.

Application filed April 5, 1920. Serial No. 371,298.

*To all whom it may concern:*

Be it known that I, EMORY A. THOMPSON, a citizen of the United States, residing at Hope, in the county of Hempstead and State of Arkansas, have invented certain new and useful Improvements in Vehicle-Wheels, of which the following is a specification.

This invention relates to vehicle wheels, and the primary object of the invention is to provide an improved wheel, so constructed as to effectively absorb shocks incident to the travel of a vehicle over a roadway, without the use of the ordinary pneumatic tire, thereby eliminating the inconveniences usually associated with the employance thereof.

Another object of the invention is to provide an improved resilient motor vehicle wheel embodying a plurality of supporting springs connected in a novel manner, so that the maximum benefit may be derived therefrom without causing undue strain or wear thereon.

A further object of the invention is to provide an improved means for regulating the tension of the springs, so that the same can be set according to the weight of the vehicle, with which they are to be associated.

A further object of the invention is to provide an improved tire or casing for association with the improved wheel, so arranged and constructed that the same may be readily and quickly removed for replacement or repair, when worn or injured.

A still further object of the invention is to provide an improved resilient wheel of the above character which is durable and efficient in use, one that is simple and easy to manufacture, and one which may be placed upon the market at a reasonable cost.

Other objects of the invention will appear in the following detailed description, taken in connection with the drawings, forming a part of this specification, in which drawings:

Figure 1 is a transverse section through a vehicle wheel and tire constructed in accordance with my invention, taken on the line 1—1 of Fig. 2 of the drawings.

Fig. 2 is a fragmentary side elevation of the wheel showing parts of the same in section.

Fig. 3 is an enlarged fragmentary detail transverse section showing the means of attaching a supporting spring to the tire section and for adjusting the tension thereof, and Fig. 4 is a section through the vehicle wheel and tire taken on the line 4—4 of Fig. 2.

Referring to the drawings, in detail, wherein similar reference characters designate corresponding parts, throughout the several views, the numeral 5 indicates the improved wheel, which includes a pair of disk shaped plates 6 and 7, which are secured to an ordinary or any preferred type of hub structure, (not shown). The outer edges of the plates have arranged therebetween, an annular solid wood felly 8, having the outer edges thereof provided with oppositely directed annular flanges 9, which are fitted in annular grooves or ways 10 formed on the plates 6 and 7, which form means for preventing relative lateral and radial movement of the felly in relation to the plates 6 and 7. The outer surfaces of the guide ways 10 are provided with abrupt shoulders 11, which form seats for the retaining casing rings 12, which will be hereinafter more fully described. The outer edges of the plates 6 and 7 are bent outwardly as at 13, adjacent to the central circumferential line of the felly 8, and are continued outwardly to form guides or stops as will be hereinafter more specifically described. Coil springs 14 are positioned intermediate the flanges 13 and are arranged in spaced relation around the felly 8 and extend radially therefrom. The extensions 13 formed on the plates 6 and 7 form in connection with the retaining casing rings 12 positive means for holding the tire casing 16 in position, which will be hereinafter more fully described. The felly 8 is provided with a plurality of radially extending openings or sockets 17 which extend in direct circumferential alinement, and these sockets or openings 17 receive the inner terminals of the supporting coil springs 14. The inner ends of the coil springs 14 are looped to provide eyes 18 for the reception of the retaining bolts 19 which extend transversely through the wheel and form means for securely fastening the felly 8 in position in relation to the side plates 6 and 7 so as to prevent relative circumferential movement of the felly 8 in relation to the plates. The outer convolution of each spring 14 is fitted in an annular groove 20 formed in the outer surface of the nut 21, which is adjustably mounted on the bolt 22, carried by the central portion of the annular metallic tire section 23, which extends around the felly 8 and is held in spaced relation thereto by means of the springs 14. By turning the bolts 22 it can be seen that the tension of the springs can be adjusted according to the weight, which the vehicle wheel is to support.

The springs 14 are each covered by a flexible rubber hose or tube 24, which protects each of the springs from dirt or the like and prevents any noise of the springs during the compression and expansion thereof. The metallic tire section 23 is curved transversely and is provided with inwardly directed flanges 25, which are inclined toward each other, and inwardly of the guide flanges 13, and the flanges 25 are adapted to engage the flanges 13 when the springs are compressed so as to prevent lateral or sidewise movement of the tire section 23, in relation to the felly. The flanges 13 and 25 form stops for limiting the inward movement of the tire section 23, when the springs are compressed, and owing to the inclination of these flanges the checking or stopping of the inward movement of the tire is brought about gradually.

Relatively heavy rubber cushions 33 are arranged intermediate the springs 14 and the cushions are disposed inwardly of the outer edge of the flanges 13 and are adapted to be engaged by the flanges 25 when the springs are fully compressed on rough roads. This effectively absorbs the shock and prevents transmission thereof to the vehicle body. The cushions are held in place by suitable fastening elements 34 which extend throughout the flanges 13 into the cushions.

It can be seen that owing to the shape of the flanges 13 and 25 the flanges 25 will strike the cushions 33 before contacting with the flanges 13 and thus bring about a gradual stop of the tire section 23.

The tire casing 16 includes a tread section 26 and side walls 27 and the tread section and side walls are made separate from one another so that when the tread becomes worn, the same can be removed and replaced without necessitating the expense of buying a whole new tire casing. However the tire casing can be formed integral if so desired. The inner edges of the side walls 27 are provided with inwardly directed beads 28 which engage under the flanges 13 and the same are held in place by the fastening rings 12, which are in turn held in place by the bolts 29 which extend through the beads 28 and the extending flanges 13 of the side plates 6 and 7. The outer edges of the side walls 27 are provided with relatively thin flanges 30, which engage the tire section 23 and the same terminate short of one another. The tread 26 rests upon the flanges 30 and is held in place by suitable fastening elements 31, which are counter-sunk in the tread 26 as at 32 and extended into the flanges 30 and the tire section 23.

From the foregoing description, it can be seen that an improved resilient vehicle wheel is provided, which will effectively absorb all shock transmitted thereto and absolutely eliminate the necessity of using the ordinary pneumatic tire now in vogue.

Changes in detail may be made without departing from the spirit or scope of my invention; but,

I claim:

1. A vehicle wheel comprising an annular felly and a plurality of radiating spokes carried by the felly formed of coil springs, a tire section surrounding said felly and springs, shock absorbing pads arranged intermediate the springs for engagement with the tire section when the same is compressed beyond a predetermined point, and adjustable means connecting the springs to the tire section.

2. A vehicle wheel comprising a pair of spaced side plates, a felly positioned between the side plates, said plates having inwardly and outwardly directed flanges arranged to engage the periphery of the felly and extend outwardly thereof, said felly having a plurality of sockets formed therein, a plurality of radiating springs arranged in the sockets, fastening means extending through the plates and felly and engaging the inner ends of the springs, and an annular tire section extending around the felly and receiving the outer terminals of the springs.

3. A vehicle wheel comprising a pair of spaced plates, a felly arranged between the plates adjacent to the outer edges thereof, the outer edges of the plates having inwardly extending flanges arranged to engage the outer surface of the felly, said flanges being bent outwardly to provide guide flanges, and a plurality of radiating springs carried by the felly and arranged between said guide flanges, an annular tire section arranged around the felly, and means securing the springs to the tire section, said tire section having inwardly extending flanges formed thereon arranged to engage the guide flanges to prevent relative lateral movement of the tire section in relation to the felly.

4. A vehicle wheel comprising a pair of spaced plates, a felly positioned between the plates adjacent to the outer edges thereof, the plates having inwardly extending flanges arranged over the outer surface of the felly, the flanges being bent outwardly to provide a guide channel, the felly having a plurality of radially extending sockets formed therein, tension springs seated in the sockets, and extending outwardly thereof and through the guide channel, an annular tire section arranged around the felly, means adjustably securing the springs to the tire section, and inwardly extending guide flanges formed on the tire section and arranged to slidably engage the flanges formed on the plates to prevent relative lateral movement of the tire section in relation to the felly.

5. A vehicle wheel comprising a pair of spaced plates, a felly positioned between the plates adjacent to the outer edges thereof, the plates having inwardly extending flanges engaging the outer surface of the felly, said flanges being bent outwardly to provide a guide channel, radially extending tension springs carried by the felly and extending through the guide channel, an annular tire section arranged around the felly and receiving the outer terminals of the springs, a sectional casing arranged around the tire section and having inwardly extending beads formed on its inner edges arranged to engage the inwardly extending flanges formed on the side plates, the outer surface of the guide channel engaging the beads formed on the casing, and attaching rings arranged to engage the outer surface of the beads of the casing.

6. A vehicle wheel comprising a pair of spaced plates, a felly positioned between the plates adjacent to the outer edges thereof, the plates having inwardly extending flanges engaging the outer surface of the felly, said flanges being bent outwardly to provide a guide channel, radially extending tension springs carried by the felly and extending through the guide channel, an annular tire section arranged around the felly and receiving the outer terminals of the springs, a casing arranged around the felly and having inwardly extending beads formed on its inner edges arranged to engage the inwardly extending flanges formed on the side plates, attaching rings arranged to engage the outer surface of the beads of the casing, and heavy rubber cushions arranged in the guide channel between the springs to engage the tire section.

7. A vehicle wheel comprising a felly, a rim carried by the felly, outwardly extending flanges formed on the rim, a tire section surrounding the rim, inwardly extending flanges formed on the tire section and disposed inwardly of the flanges on the rim, tension springs uniting the felly and tire section, and shock absorbing pads arranged intermediate the springs and adapted to be engaged by the tire section flanges when the tension springs are compressed beyond a certain point.

EMORY A. THOMPSON.